United States Patent [19]

Larive

[11] 4,235,831

[45] Nov. 25, 1980

[54] CONDUIT MAKING METHOD

[76] Inventor: David Larive, 7707 Bryonwood, Houston, Tex. 77055

[21] Appl. No.: 906,423

[22] Filed: May 16, 1978

Related U.S. Application Data

[63] Continuation-in-part of Ser. No. 660,606, Oct. 18, 1976, abandoned.

[51] Int. Cl.[3] ........................ B28B 1/08; B29C 23/00; B29D 3/02; B28B 1/28

[52] U.S. Cl. .................................... 264/129; 264/162; 264/173; 264/228; 264/259; 264/267; 264/310; 264/333

[58] Field of Search .................................... 264/33-35, 264/150, 309, 310, 228, 333, 145, 162, 129, 259, 267, 173; 118/DIG.11, 13, 107, 110, 112; 156/184, 193; 83/47, 82; 425/106, 100, 101, 510, 470, 471, 307, 426, 445, 446

[56] References Cited

U.S. PATENT DOCUMENTS

| | | | |
|---|---|---|---|
| 2,963,765 | 12/1960 | Tillman | 264/79 |
| 3,055,073 | 9/1962 | Gerwick | 425/111 |
| 3,086,509 | 4/1963 | Henley | 144/205 |
| 3,146,508 | 9/1964 | Berliner et al. | 425/114 |
| 3,276,092 | 10/1966 | Pankow | 425/224 |
| 3,293,963 | 12/1966 | Carroll et al. | 83/54 |
| 3,392,222 | 9/1968 | Cordon | 264/79 |
| 3,520,749 | 7/1970 | Rubenstein | 156/173 |
| 3,691,992 | 9/1972 | Beemer | 425/106 |
| 3,733,939 | 5/1973 | Paysinger et al. | 144/205 |
| 3,740,291 | 6/1973 | Mallard | 156/392 |
| 3,761,557 | 9/1973 | Werner | 264/309 |
| 3,901,963 | 9/1975 | Werner | 264/309 |
| 4,033,387 | 7/1977 | Nijs et al. | 264/228 |

*Primary Examiner*—W. E. Hoag
*Attorney, Agent, or Firm*—Michael L. Parks

[57] ABSTRACT

This invention relates to a method for making concrete conduit. The method of this invention pertains to forming a conduit mat of material on a form, advancing the formed conduit mat of material from the form, fastening the conduit mat together, cutting the conduit into desired lengths, applying concrete on the conduit mat, working the concrete from both the inside and outside of the conduit mat to form smooth surfaces on both surfaces of the concreted conduit mat and curing the concreted conduit mat to form concrete conduit. In one embodiment of this invention, the method is performed from a mobile base which moves forward as the concrete conduit is continuously made and layed on the ground or underwater.

9 Claims, 11 Drawing Figures

CONDUIT MAKING METHOD

DIVISIONAL APPLICATION

This application is a continuation in part of an application pending under Ser. No. 660,606 filed Oct. 18, 1976 now abandoned.

SUMMARY OF THE INVENTION

This invention relates to a method for making concrete conduit. This invention provides a method for forming concrete conduit in many shapes and sizes. The method of this invention more particularly pertains to the forming of a conduit mat over a form, advancing the conduit mat off the form; and concreting it. The method further pertains to fastening the conduit mat together prior to concreting it and then cutting it to desired lengths. The concrete is worked into the conduit mat from both the inside and outside to form concrete conduit having relatively smooth surfaces. The concreted conduit is then cured to form a finished concreted conduit.

BACKGROUND OF THE INVENTION

The art of making concrete pipe and conduit is old and much prior art exists; however, the prior art pipe and conduit making methods have many deficiencies. For example, the prior art of Rubenstein U.S. Pat. No. 3,520,749 makes concrete pipe by the method of extruding concrete about a plastic liner, thus the plastic liner becomes part of the pipe. In these days of high priced petroleum based products, the plastic for such liners is expensive which makes pipe of this invention very expensive. Also the art of Rubenstein requires an extrusion process to bond the concrete with the plstic pipe liner. Also the concrete used in Rubenstein has other binders of polymeric resins mixed with the concrete to aid in bonding the concrete to the plstic line. Another problem with Rubenstein, in addition to increased costs of the plastic line, is that he requires expensive dies for the extrusion process and such dies are subjected to wear from the grit of the concrete. Also the method of Rubenstein has many problems with controlling the resins so that the resins do not prematurely set-up or fail to set-up, either of which prevents the concrete from bonding to the plastic liner. Further the pipe produced by this invention is a sandwich type pipe which when put in the ground is subject to failure at the interface of the two materials, to-wit: the bonding point of the concrete and the plastic line thus creates points of weakness in the pipe which make it subject to premature failure.

Further such prior art as Berliner U.S. Pat. No. 3,146,508 has defects which require or limit the size of pipe which can be made. Also there is no interweaving of the reinforcing material for forming an interlocking relation of the formed mat and this reduces the ultimate strength of the final product.

Other prior art concrete pipe which comes in relatively short links and thus may require many joints in a pipe line, have the problem of hydraulic infiltration because the joints between each section are difficult to seal and water seeps into the pipeline. This infiltration problem is important when the pipe is sewer pipe because the infiltration into the sewer pipe causes hydraulic overloading of sewer plants which cause pollution when the sewer plants discharge inadequately treated waste.

Another problem with the prior art concrete pipe is that it requires many handlings prior to being layed in the ground which drives up the cost of laying this pipe and also provides the opportunity for breakage.

Also as much of the concrete pipe used today is made by being poured into forms, a plant must have a great inventory of forms because the pipe must remain in the form for several days. This long length of time thus requires large numbers of forms which are tied up for days at a time. it will be readily understood that the larger the inventory of forms the more costly the process for making the concrete pipe.

Further the prior art concrete pipe usually requires high cost reinforcing rod, re-bar, or heavy wire for its structural integrity. Also the prior art concrete pipe requires generally great thickness to obtain its strength, and thus is more expensive.

The present invention relates to an improved method for making concrete conduit and concrete pipe. The method of this invention provides a means for using low grade wire netting like "chicken wire", welded mesh, vegetable fiber netting, or other fibers, to form a conduit mat and may use heavy size strand wire or fiber for some application. After the mat is formed, then concrete is worked therein and over the conduit mat to form a strong concrete conduit of relatively thin walls and exceptional strength and resilient properties.

Also the method of this invention reduces the number of joints required in laying the conduit because the method of this invention can make concrete conduit in a continuous piece of any length. By having fewer joints, the cost of laying such pipe lines are reduced and the amount of hydraulic infiltration is greatly reduced.

Also the cost of making concrete conduit with this present invention is greatly reduced because of the simplicity of manufacture and the few number of operators required to be present during its manufacture.

Another object of this invention is that no liner is required in the method of its manufacture. Instead the method of this invention provides for working the inside surface with concrete while the conduit is continually advanced. Thus the concrete conduit of this invention has a relatively smooth concrete surface both inside and outside, without any need for plastic liners.

Another object of this invention is to make a homogenous concrete conduit and eliminate the sandwiching of layers of different material together.

Also another feature of this invention is that no extrusion is used in working the concrete, which eliminates the need for expensive dies for forming concrete pipe.

Also no externally applied heat is needed to form this concrete conduit into a cured finish product.

A further object of this invention is to provide a method for readily changing form size which allows the method of this invention to make various pipe sizes in unlimited quantities of any given size by needing only one form for each size.

Another object of this invention is to reduce the handling of finished pipe. In this invention the only handling is of the bulk or raw materials when the pipe is made on the site where the pipe is to be layed.

These and other objects will be apparent from the drawings and the following descriptions, the drawings which are for illustrations of some embodiments of this inventions.

Figure 1:
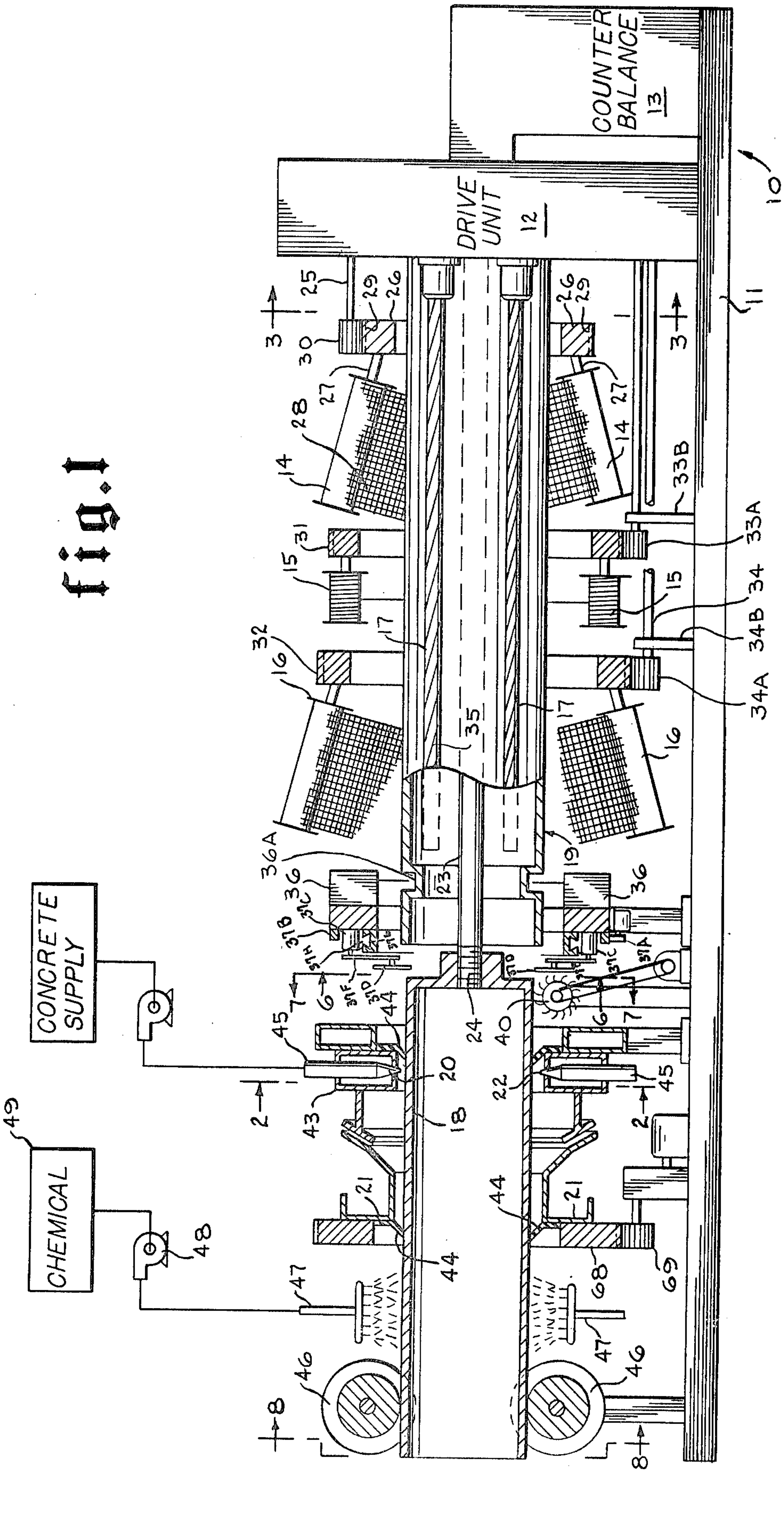
FIG. 1 is an elevation view in partial cross-section of one embodiment of an apparatus for applying the method of this invention.

Referring initially to FIG. 1 of the drawings, one embodiment of an apparatus for performing the method of this invention is generally referred to at 10. The description of this one embodiment of performing the method of this invention is to illustrate and better allow those skilled in the art to understand the method of this invention. In this embodiment a base 11 is provided for mounting a transmission 12 thereon.

Drivingly connected to the transmission 12 is a power unit 13, which provides the driving power for the transmission 12. The transmission 12 is drivingly connected to feeders 14, 15, 16, advancers 17, and first trowel 18 for their respective movement by the transmission 12. Connected to the housing of the transmission 12 is fixed form 19 for shaping a conduit mat of material. Located on recesses in the form 19 are the advancers 17 which are drivingly connected to the transmission 12 for advancing the conduit mat off form 19. The feeders 14, 15, 16 are located proximate to the form 19 for feeding material onto the form 19 which forms the conduit mat as the advancers 17 advance the formed conduit mat from the form 19. Adjacent the form 19 is a first trowel 18 for receiving the conduit mat of material as it is advanced of form 19. In the region proximate of the first trowel 18 concrete is applied to the conduit mat by injectors 20. A smoothing head 21 and second trowel 22 finishes the outer surface of the concreted conduit as it is passed thereby.

The first trowel 18 is rotatively driven by the transmission 12 for working the inside surface of the concreted conduit mat as the concrete is applied. The rotating first trowel 18 is drivingly connected to the transmission 12 by a drive shaft 23 to provide the power to rotate the first trowel 18. The first trowel 18 is connected to the drive shaft 23 by a threaded connector 24. This threaded connector 24 thus allows the first trowel 18 to be changed from one size to various sizes of first trowel 18 to be used with various corresponding sizes of form 19, which can be changed by disconnection from transmission 12 and reconnecting another size of form 19 to the transmission 12.

More specifically, it should be understood in one embodiment for practicing the method of this invention that the power unit 13 is drivingly connected to the transmission 12 for providing a counter balancing lever arm for aiding in balancing and stabilizing other apparatus which are drivingly connected to the transmission 12 and suspended from the side of the transmission 12 in a series of transmission gears (not shown) for directing rotation to other apparatus of this invention which are drivingly engaged with the gears of the transmission 12.

Figure 4:
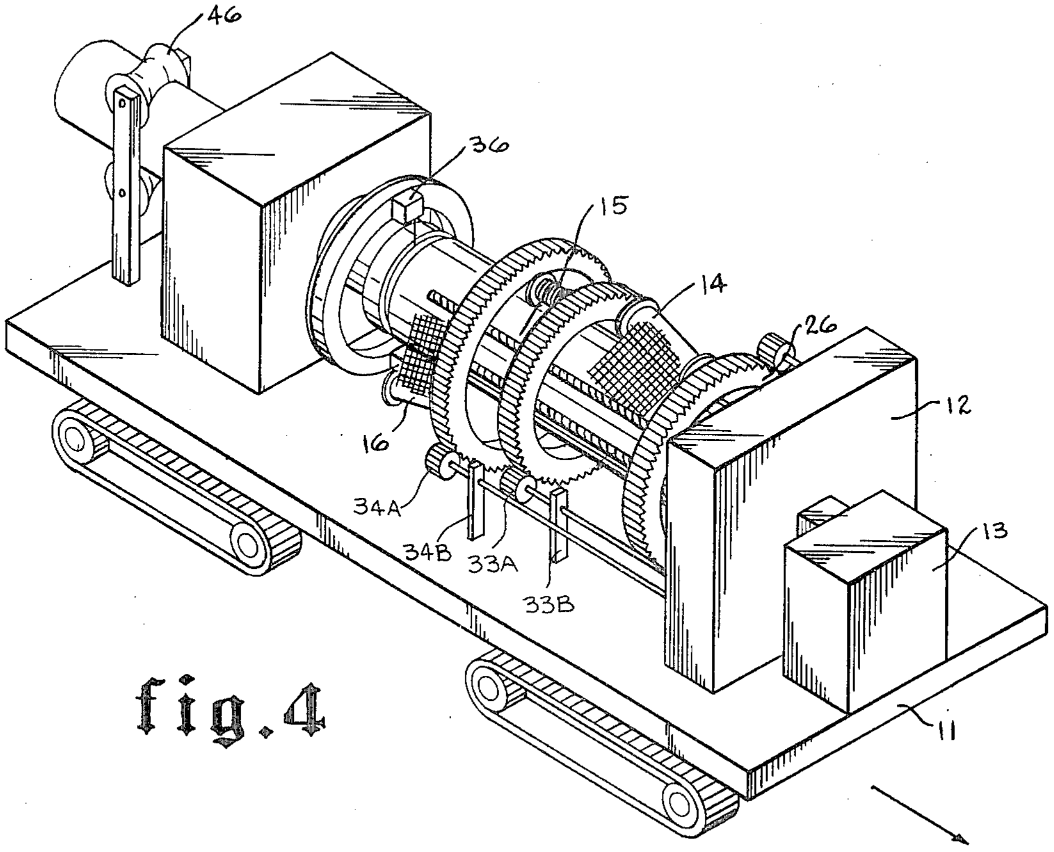
FIG. 4 is a view of an apparatus used in the method of making this invention mobile.

A gear shaft 25 is drivingly engaged with the transmission 12 for rotatively driving a gear ring 26. The gear ring 26 has mounted therefrom a feeder shaft 27 onto which is placed a feeder 14 for the feeding off the material 28 to the form 19. The feeder shaft 27 in this embodiment is mounted on the gear ring 26 for the feeder 14 to feed the material of the feeder 14 onto the form 19 on the bias. As can be seen in FIG. 4 and FIG. 1, the gear ring 26 is a circular ring 29 having gear teeth 30 on the outside surface of the ring for rotating engagement with the gear shaft 25. It should be understood that the material useable in this invention is preferably wire mesh, "chicken wire" and other relatively flexible mesh materials; however, other materials such as vegetable netting, refined organic nettings such as nylon and inorganic netting may also be used and still be in the scope of this invention. Also the feeders 14 are provided with tensioning means such as springs (not shown) to cause the material 28 to be fed off feeders 14 under tension. As the material 28 is fed off the feeders 14 under tension the material 28 is wrapped around the form 19 for interweaving and interlocking the material about the form 19 as the feeder 14 and gear ring 26 are moved circumferencially about the form 19. Thus, the material 28 is unwound off the feeder 14 and over the form 19 under tension sufficient to conform the material 28 to the shape of the form 19.

Figure 9:
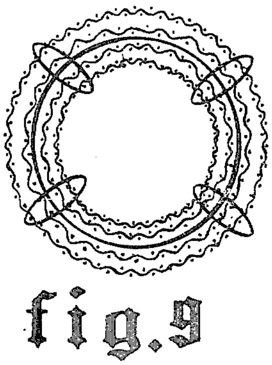
FIG. 9 is a cross-section of the pipe made by the method of this invention using mesh and wire.
Figure 10:
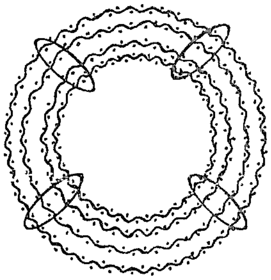
FIG. 10 is a cross-section of the pipe made by the method of this invention using mesh.

Additional feeders 15 and 16 are also provided for applying multiple layers of material on the form 19 to form multiple layers of a material as shown in FIG. 10. Also these feeders 15 and 16 may feed different materials to achieve different properties in the finished pipe. For example, heavy wire may be fed off feeder 15 and mesh off feeder 14 and 16 to produce a spiral wrap of heavy wire between mesh layers for improved strength of the concreted conduit as shown in FIG. 9. The feeders 15 and 16 are driven in a like manner as the feeder 14 by respective gear rings 31 and 32 which are drivingly engaged with gear shafts 33 and 34 which are then drivingly connected to transmission 12 in a manner which does not interfere with the applying of material on form 19. In one such embodiment gear rings 31 and 32 are supported on gears 33A and 34A, by said gears 33A and 34A being on supports 33B and 34B mounted on base II. These feeders 15 and 16 also unwind the material 28 over the form 19 under tension. The tension applied on the material as it is unwound over the forms causes the wire material to adapt to the shape of the form 19.

As all feeders 14, 15 and 16 are unwinding material over the form 19, advancer 17 moves the material which has been formed into a conduit mat over the form 19 off the form 19.

Figure 3:
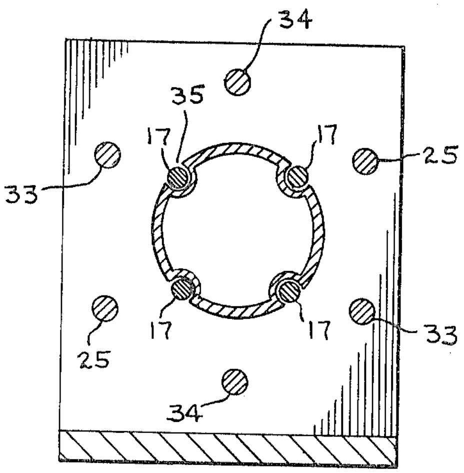
FIG. 3 is a cross-section view taken through lines 3—3 of FIG. 1 showing one embodiment of apparatus for forming and advancing the mats formed in the method of this invention.

The advancer 17 can best be seen as shown in FIG. 3, where in this embodiment there are four separate advancers 17 shown. The advancers 17 are mounted within slots or grooves on the form 19 with their outside surface extending above the outside surface of the form 19. The surface of the advancers provided above the outside surface of form 19 is grooved or threaded to form a worn gear 35. The material 28 is pressed over and against the worn gear surfaces 35 as it is fed on the form 19 and advancers 17 advancers 17 are drivingly rotated by the transmission 12 to which they are drivingly connected, and the worm gear surfaces 35 of advancers 17 will engage the conduit mat and continuously advance the conduit mat off form 19.

Figure 6:
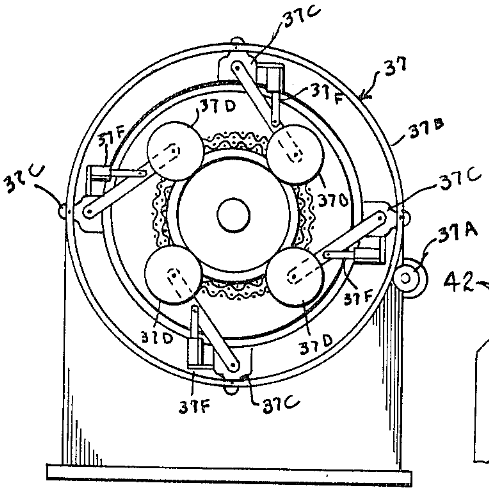
FIG. 6 is a cross-section view taken along lines 6—6 of FIG. 1 showing the cutting step in one embodiment of this invention.

As the conduit mat is advanced off form 19, a fastener 36 of a conventional type such as a "hog ringer" stapler is provided to fasten the conduit mat layers together as the conduit mat is being advanced off the form 19. This fastening with fasteners serves to strengthen the mat, and to hold it together in a uniform thickness and shape after it leaves the form 19. In some applications of materials, fastening the fastener 36 is not used because it is not necessary when the materials have properties which keep their shape without fastening. Proximate the end of the form 19 is a cutter 37 for cutting the conduit mat into desired lengths. The cutter 37 in one embodiment is mounted for driving engagement at a driver gear 37A which is in driving relationship with the transmission 12, (not shown) for rotation of a cutter driving ring 37B. The cutter driving ring 37B is circumferentially mounted about the concreted conduit of this invention. Connected to the cutter driving ring 37B are track mounted motors 37C for driving cutter wheels 37D which are drivingly connected to track mounted motors 37C. Attached to the track mounted motors 37C are hydraulic pistons 37F for advancing on retracting the cutter wheels from cutting engagement with the concreted conduit. In the embodiment shown in FIG. 6, there are four such cutter wheels 37D and thus the cutting of the concrete conduit of this method is accomplished by advancing the four cutter wheels 37D into cutting engagement with the concreted conduit and then rotating the cutter driving ring 37B by the driver gear 37A driving the cutter driving ring 37B through 90° for a complete cutting of the concreted conduit. After the cutting is complete, the hydraulic pistons 37F are retracted and additional concreted conduit is placed in relation for cutting. It should be noted that the track mounted motors 37C rides in a track 37G best seen in FIG. 1 and has a male member 37H which fits in the track 37G for alignment in forming a straight clean cutting. It should also be understood that any number of cutting wheels 37D may be employed to perform the cutting but the number of cutting wheels 37D present only determines the degrees of rotation required by cutter drive ring 37B to cut the concreted conduit. It should be understood by those skilled in the art that any cutter may be used which would produce a smooth cut while the conduit mat is being advanced. Further in some application, it may be desirable to stop the advancement of the mat and make a cut through the conduit mat and this type cutting would not depart from the teaching of this invention.

Adjacent to the point of discharge from form 19, there is provided a first trowel 18 which has an outside diameter slightly smaller than form 19, onto which the conduit mat is advanced. The trowel 18 is connected to the transmission 12 by a shaft 23 which is drivingly connected to the transmission 12. The transmission 12 drives the shaft 23 and first trowel 18 in rotary motion as the conduit mat is fed onto the first trowel 18.

As the conduit mat is fed along the first trowel 18, centering rollers 40 are located about the lower portion of the first trowel 18 for receiving the conduit mat and raising it sufficiently to approximately center the conduit about the first trowel 18. In one embodiment, a power drive belt 41 is also provided to the centering rollers 40 for imparting additional advancing forces to the conduit mat. Centering rollers 40 may also be provided with spikes 42 set for engagement with and advancement of the conduit mat.

Further as the conduit mat is fed along the first trowel 18, a ring 43 is provided about the first trowel 18 into which is mounted concrete injectors 20 for applying concrete onto the conduit mat and first trowel 18 as the mat is passed along the first trowel 18. Just prior to the point of applying concrete to the conduit mat, a resilient seal 44 is provided about the first trowel 18 for preventing concrete from escaping the concreting zone. Also connected to the ring 43 between the concrete injector 20 are second trowels 22 having concrete vibrators 45 connected to the second trowel 22 for vibrating and working the concrete into the conduit mat. A better view of ring 34 can be seen in FIG. 2.

Figure 2:
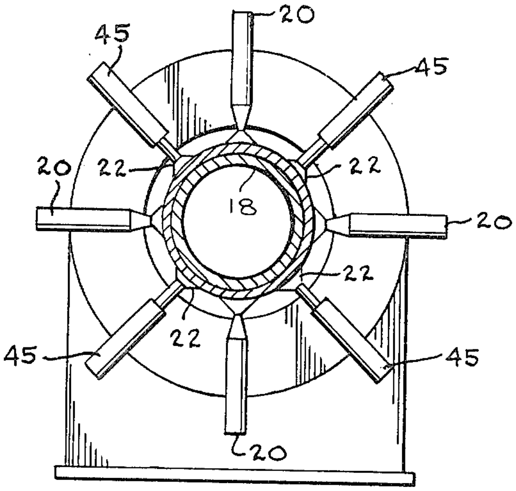
FIG. 2 is a cross-section view taken through lines 2—2 of FIG. 1 showing one embodiment of apparatus for use in steps of vibrating and injecting cement in the method of this invention.
Figure 7:
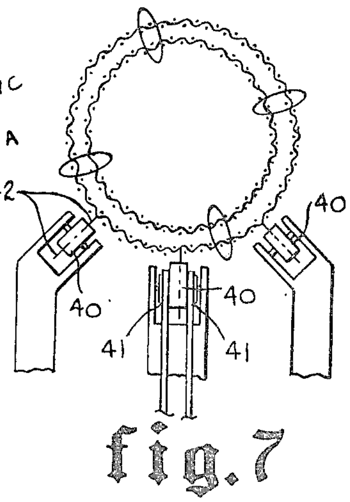
FIG. 7 is a cross-section view taken through lines 7—7 of FIG. 1 showing the step of centering the mat in one embodiment.
Figure 8:
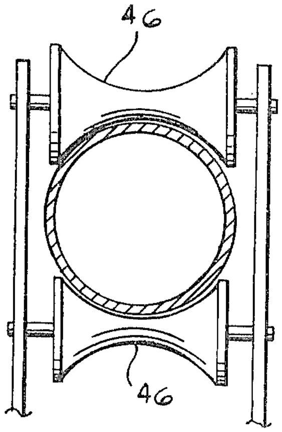
FIG. 8 is a cross-section view taken through lines 8—8 of FIG. 1 showing one embodiment for the step of advancing said concreted conduit.

In FIG. 2 it can be seen that the concreted conduit mat is advanced through the ring 43 which substantially encircles the first trowel 18. Just prior to the conduit mat being passed to the ring 43, centering wheels 40 shown in FIG. 7 raise the conduit mat to position it substantially in the center of the first trowel 18. The centering wheels 40 can also be supplied with power drive 41 from transmission 12 if needed to aid the advancing of the conduit mat through ring 43. As the conduit mat is advancing, a concrete injector 20 drives the concrete into and through the conduit mat. Dispersed between the injectors 20 are second trowels 22 which have the concrete vibrator 45 connected thereto for working the concrete with sound waves to form a concreted conduit mat which is substantially homogenous and without air pockets. As the first trowel 18 is being rotated by the shaft 23, it is continuously smoothing the inside surfaces of the concreted conduit mat as the mat is advanced. Before passing off the first trowel 18, the concrete conduit mat passes through smoothing heads 21 and resilient seals 44 which are mounted about the outside surface of the concreted conduit for working the cement along the outside diameter to provide a finished surface. In some applications, the smoothing heads 21 are rotated about said concreted conduit in a direction opposite to the direction of rotation of said first trowel 18 by drive gears 69 which rotate smoothing ring 68. Sometimes the direction of rotation of the smoothing heads 21 may be alternated first in one direction and then the other direction.

The concreted conduit can be coated to control the curing rate after passing through the resilient seals 44. The coating in one embodiment is sprayed on by nozzels 47 which are connected to a pump 48 and a chemical supply tank 49. In another embodiment a thin film is sprayed or blown about the outside surface to control the curing rate. Also wrapping or coating the outsides of the concreted conduit with paper or other materials may provide controlled curing of the concreted conduit.

To aid in removing the concreted conduit, concaved rollers 46 are provided to receive and remove the concreted conduit without damaging the formed shape.

In at least one embodiment of apparatus showing the method of this invention it is seen that the method of this invention may be practiced while mounted on tracked wheels for movement as the method is practiced for forming the pipe and simultaneously laying it as it is made. Also contemplated by this invention would be the use of a barge for the transportation of this method for pipe making and laying the pipe under water as it is made. it should also be understood that the pipe making method of this invention may be located within a conventional factory and used to manufacture pipe from a fixed location.

Figure 11:
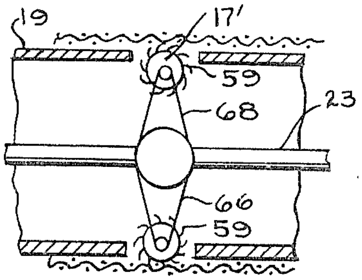
FIG. 11 is a cross-section of another embodiment showing the advancing step for advancing the mat.

Also the method for advancing the conduit mat may be accomplished by an apparatus embodiment using advancer 17 as shown in FIG. 11 which may be a spiked wheel 59 for imparting advancing movement to the conduit mat as it is formed on form 19. In the advancer 17 the power for driving the spiked wheels 59 is from driving engagement of belt 66 with the drive shaft 23.

Figure 5:
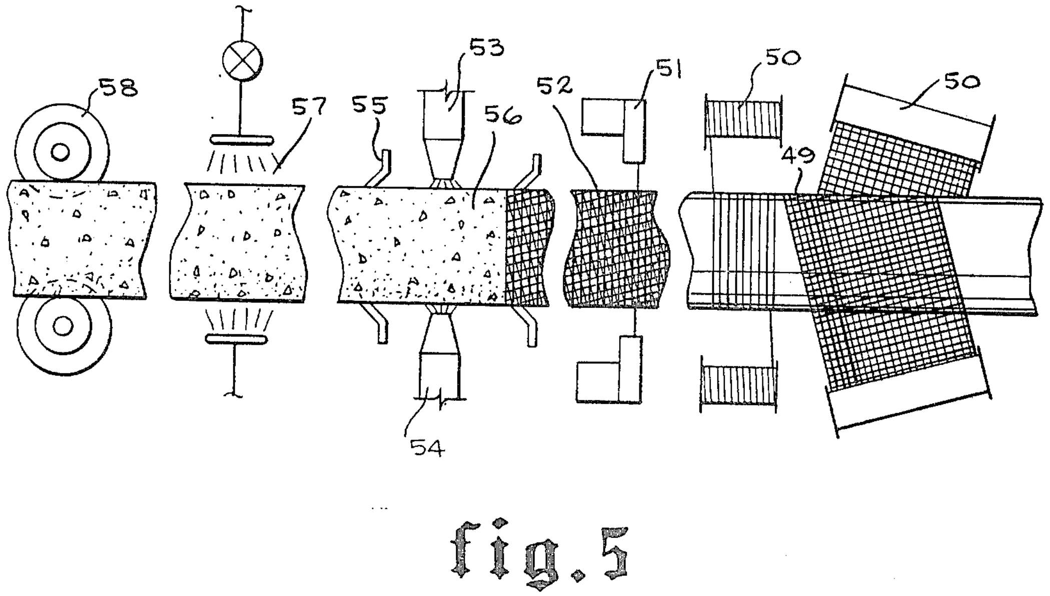
FIG. 5 is a diagramatic drawing of the method of this invention.

The method of this invention is more particularly shown in FIG. 5 which comprises forming a conduit mat in a mat forming zone 49. The method of forming this mat comprises directing the material to be used in the forming of the mat from feeding zones 50 into the mat forming zone 49 by the feeding zone 50 being rotated circumferentially about the mat forming zone 49 and allowing the material to be unrolled from the feeding zone 50 under tension sufficient to cause the material to conform to the shape of the mat forming zone 49.

In this method it has been found advantageous to feed the mat forming material into the mat forming zone 49 on the bias and further it has been found that such materials as square welded mesh, chicken wire, and other low grade material of a relatively tight knit weave would be considered as preferred materials. Also in some applications, a single strand or strands of thicker wire or other material may be place between the layers of mesh; so that the mesh forms the inner and outer surfaces of the conduit. However, it has also been found that other mesh type materials such as organic and non-organic fibers may be used to form concreted conduit of this invention.

As the conduit mat is formed, it is then advanced from the mat forming zone 49 to fastening zone 51 for fastening the layers of the conduit mat together. As the conduit mat is further advanced, the conduit mat is cut into desired lengths in the cutting zone 52.

After cutting the conduit mat is advanced to a concreting zone 53 for applying concrete on the formed mat. As the concreted mat is further advanced over the concreting zone 53, smoothing of the internal surfaces of the concreted mat are accomplished by rotating a first trowelling means 56 inside the concreted conduit as the concreted conduit is advanced over the concreting zone 53. The external surface of the concrete conduit is smoothed by vibrating second trowelling zone 54 and passing smoothing edge 55 adjacent to the concreted pipe. It has also been found on some occasions that the addition of water and/or other fluids can provide lubrication between the smoothing surfaces and the pipe as the concreted conduit is advanced. Curing the conduit mat is accomplished by controlling the drying rate by coating the outside of said concreted conduit to control the moisture loss in a curing zone 57. The finished product is then taken off said concreted conduit by take off zone roller 58.

It should be understood by those skilled in the art that the smoothness of the product depends on the consistency of the concrete being used and its drying qualities and its viscosity or fluidity at the time of application to the concreted conduit. Compounds can be added to the concrete to control the curing and setting up rates and other characteristics of these concretes.

The foregoing disclosure and description of the invention is illustrative and explanatory thereof, and various changes, shape and materials as well as in the details of the illustrated construction may be made within the scope of the appended claims within the scope of the appended claims without departing from the spirit of this invention.

I claim:

1. A method for making concrete conduit comprising:

(a) forming a conduit mat in a mat forming zone by feeding material on the bias and under tension onto a form in said mat forming zone, (b) advancing the said formed conduit mat from said form and forming zone, (c) applying concrete on said conduit mat as said conduit mat is placed over a trowel thereby forming a concrete conduct, (d) moving said conduit axially only, (e) rotating a trowel circumferentially about said inside surface of said concreted conduit relative to the direction of advance of said concreted conduit for smoothing said concrete applied on said mat, and (f) curing the concreted mat to form the concrete conduit.

2. The method of claim 1 wherein said step of forming a conduit mat further comprises feeding the material to form said mat from circumferential position about said mat forming zone for interweaving of said material about said form and for forming an interlocking relation of said material in said formed mat.

3. The method of claim 2 including vibrating said concrete.

4. The method of claim 3 further comprising fastening said conduit mat together.

5. The method of claim 4 further comprising cutting said conduit in section.

6. The method of claim 5 wherein said step of cutting said conduit in sections further comprises advancing cutters into the concreted conduit mat and rotating the cutters about said concreted conduit mat for cutting the concreted conduit mat into sections.

7. The method of claim 6 wherein said step of smoothing said concrete further comprises rotating a smoothing edge about the outside of said concreted conduit.

8. The method of claim 7 wherein said step of smoothing said concrete futher comprises rotating said trowel in a direction opposite said direction of rotation of said smoothing edge.

9. The method of claim 8 including controlling the rate of drying said concrete by adding a drying control compound to said concrete and coating the outside of said conduit with a suitable substance.

* * * * *